Aug. 12, 1958         J. V. HENDRICKSON ET AL         2,847,230
FIFTH WHEEL CONSTRUCTION FOR FORCE DISTRIBUTION
BETWEEN TRACTOR AND SEMI-TRAILER
Filed Feb. 10, 1956                                 2 Sheets-Sheet 1
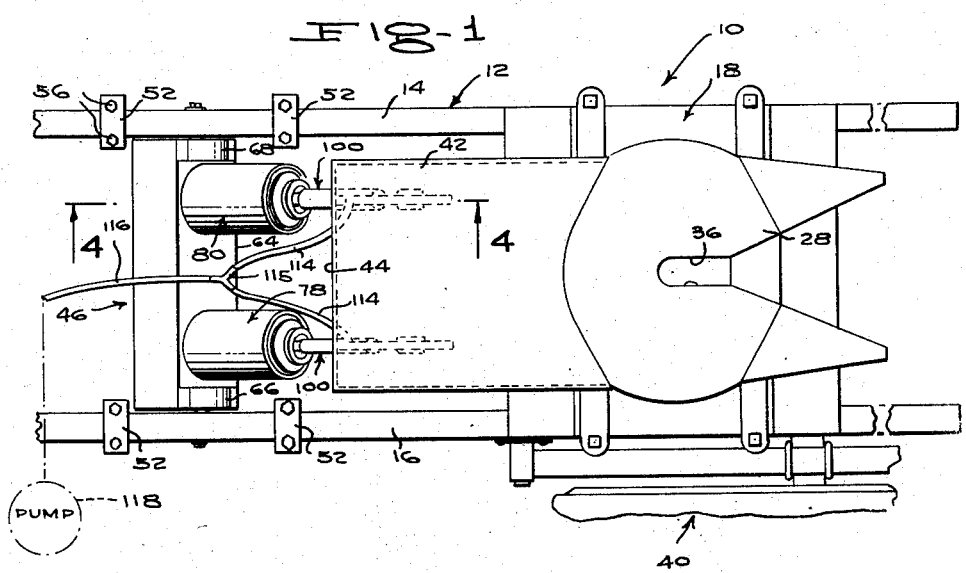
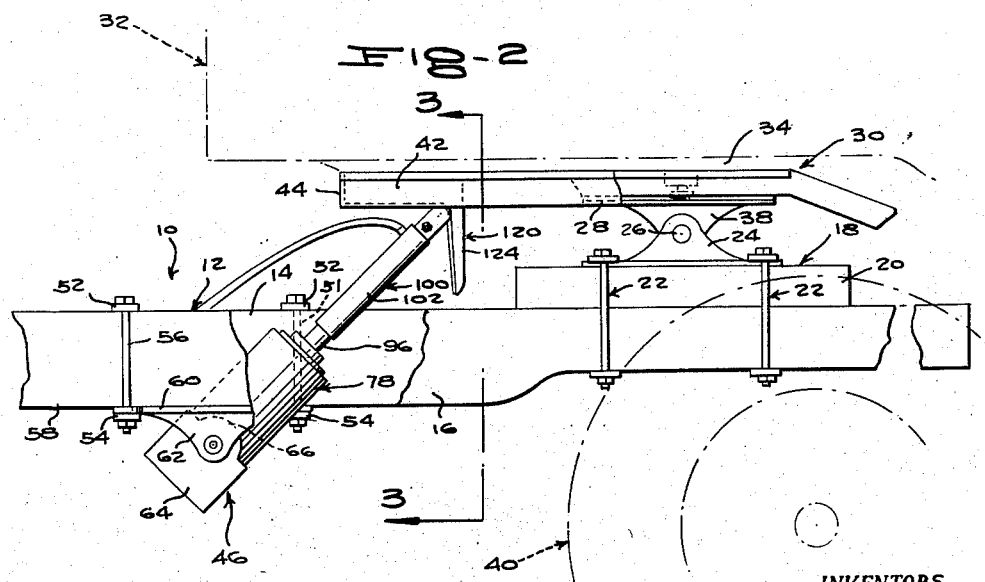
INVENTORS
JOHN V. HENDRICKSON
& GEORGE J. HARTWICK
BY
McMorrow, Berman + Davidson
ATTORNEYS Aug. 12, 1958     J. V. HENDRICKSON ET AL     2,847,230
FIFTH WHEEL CONSTRUCTION FOR FORCE DISTRIBUTION
BETWEEN TRACTOR AND SEMI-TRAILER
Filed Feb. 10, 1956     2 Sheets-Sheet 2
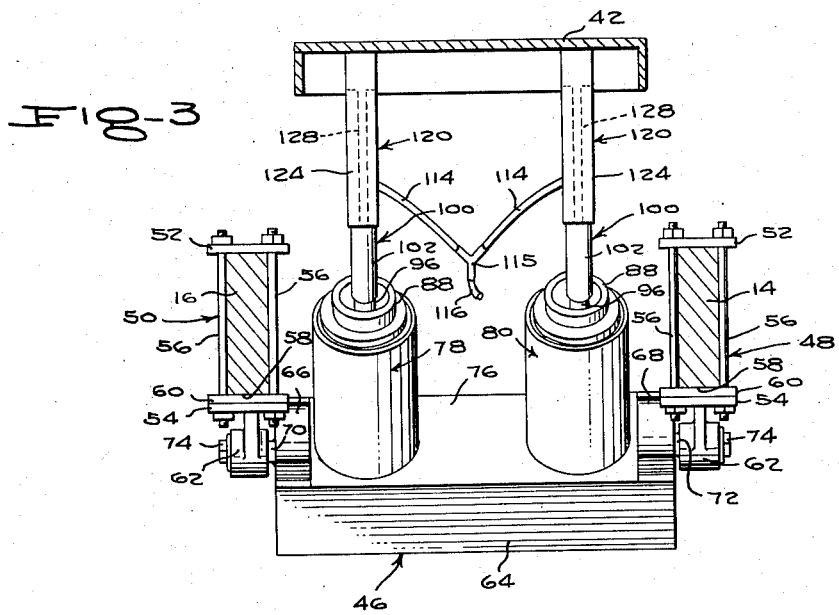
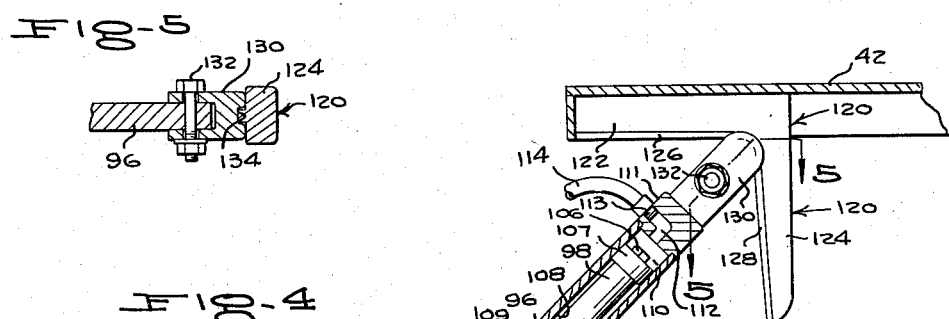
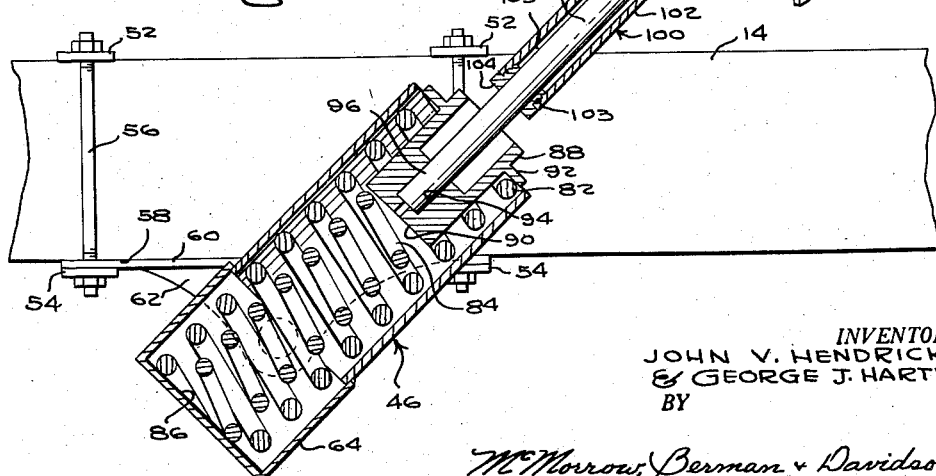
INVENTORS
JOHN V. HENDRICKSON
& GEORGE J. HARTWICK
BY
McMorrow, Berman & Davidson
ATTORNEYS United States Patent Office 2,847,230
Patented Aug. 12, 1958

2,847,230

FIFTH WHEEL CONSTRUCTION FOR FORCE DISTRIBUTION BETWEEN TRACTOR AND SEMI-TRAILER

John V. Hendrickson and George J. Hartwick, Waukegan, Ill., assignors, by direct and mesne assignments, of one-half to said Hendrickson and one-half to Russell W. Bullamore, Kenosha, Wis.

Application February 10, 1956, Serial No. 564,717

7 Claims. (Cl. 280—406)

This invention relates generally to vehicular trains and is more particularly concerned with the "fifth wheel" connection between tractor and semi-trailer combinations.

This case relates generally to our co-pending application Serial No. 520,750, filed July 8, 1955, titled Fifth Wheel Construction.

A primary object of the invention is to provide a force distributing and dampening means disposed between the tractor frame and the "fifth wheel" assembly thereof for mounting a semi-trailer thereto, whereby the effect of the trailer load on the tractor is shifted in part from the tractor rear axle to the tractor front axle and sudden shock and excessive forces resulting from sudden stops, striking bumps, et cetera which place undue strain on the "fifth wheel" assembly are appreciably reduced and deterred resulting in reduction of wear of the cooperating parts of the "fifth wheel" assembly and providing greater durability, safety and long life of the cooperating "fifth wheel" parts.

A further object of invention in conformance with that set forth above is to provide a novel "fifth wheel" assembly for a tractor and semi-trailer combination in which the tractor includes a combined fluid controlled motor and resiliently urged shock absorbing and force dampening assembly mounted on a horizontal pivot axis on the tractor frame, said fluid controlled motor and shock absorbing and force dampening assembly being effective to shift the weight distribution of load on a semi-trailer and including extensible cam means slidably engaged with cam track means on a lower abutment portion on the tractor "fifth wheel" assembly whereby sudden movements of the "fifth wheel" about its horizontal pivot axis on the tractor frame are substantially dampened providing a stabilized and efficiently operating "fifth wheel" assembly.

A further object of invention in conformance with that set forth above is to provide an improved "fifth wheel" assembly of the character set forth which is readily manufactured and installed, efficient and safe in operation, and highly practical and efficient for the purposes intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a fragmentary rear end portion of a tractor and the novel "fifth wheel" assembly thereof;

Figure 2 is a side elevational view of the structure of Figure 1, with parts broken away for clarity, showing in phantom lines the rear support wheels of the tractor, and a forward fragmentary portion of a semi-trailer in mounted position on the "fifth wheel" of the tractor;

Figure 3 is an enlarged fregmentary sectional view taken substantially on line 3—3 of Figure 2;

Figure 4 is an enlarged fragmentary sectional view taken substantially on line 4—4 of Figure 1; and Figure 5 is an enlarged fragmentary sectional view taken substantially on line 5—5 of Figure 4.

Referring to the drawings wherein like reference numerals identify similar parts, a fragmentary portion of a tractor is indicated generally at 10, said tractor including a frame 12 incorporating spaced side frame members 14 and 16 which have suitably mounted in transverse horizontal relationship across an upper end portion thereof a "fifth wheel" support member indicated generally at 18.

The "fifth wheel" support member 18 includes a horizontal plate member 20 suitably secured to the frame members 14 and 16, for example, by means of the bolt assemblies 22, and having secured on an upper surface portion thereof a pair of transversely spaced journal bracket ear elements 24 having transversely aligned bore portions through which extend a suitable pivot axle member 26, see Figure 2. The pivot axle member 26 constitutes a horizontal pivot axis portion for a lower member 28 of a tractor "fifth wheel" assembly indicated generally at 30. Again referring to Figure 2, there is shown in phantom lines a fragmentary portion of a semi-trailer 32 which has suitably secured on a lower forward surface end portion a cooperating upper member 34 which is engageable in the converging slot 36 of the lower member 28. The lower member 28 has depending therefrom a pair of spaced pivotal support bracket ears 38, only one being shown, which have transversely aligned aperture portions journaled on the pivot axle 26.

The heretofore described structure is of a conventional nature being that normally found in a "fifth wheel" assembly of a tractor and a semi-trailer combination. The tractor has suitably secured on a lower rear end portion of the frame conventional support wheel assemblies, one of which is indicated at 40 and includes the tractor rear axle.

The lower member 28 of the "fifth wheel" assembly includes the forwardly extending substantially rectangular extension plate portion 42 which is in substantial alignment with the longitudinal axis of the tractor frame.

Extending forwardly from the forward edge 44 of the lower member 28 of the "fifth wheel" assembly is a combined fluid controlled motor and resilient load distributing and shock absorbing and dampening assembly indicated generally at 46. The assembly 46 includes a pair of oppositely disposed journal bracket assemblies 48 and 50 supported in transverse alignment on the respective side frame members 14 and 16, said journal bracket assemblies 48 and 50 each comprising a pair of mutually parallel horizontal plate elements 52 and 54 extending transversely across respective upper and lower portions of the side frame members 14 and 16, said plate members 52 and 54 having vertically disposed aligned aperture portions through which suitable bolt assemblies 56 extend. Juxtaposed between the lower edge portion 58 of the side frame members 14 and 16 and an upper surface portion of the plate members 54 on respective frame members 14 and 16 is an upper flange element 60 of a depending tubular journal bracket ear element 62, said journal bracket ear elements including transversely aligned bore portions for a purpose to subsequently become apparent. The aforementioned transversely aligned bore portions define a horizontal pivot axis for the previously mentioned combined fluid controlled motor and resilient shock absorbing and dampening assembly 46.

The assembly 46 includes a transverse support member 64 which has a substantially rectangular cross section, see Figure 4, said support member 64 incorporating a pair of laterally extending and mutually parallel support bracket portions 66 and 68 which have extending laterally and outwardly therefrom transversely aligned trunnion portions 70 and 72, respectively, which extend through the transversely aligned bore portions of the tubular journal bracket ear elements 62 having suitable means on terminal end portions thereof for receiving securing means, such as the nut elements 74 thereon. In this manner, the support member 64 is supported and secured on a horizontal pivot axis on the frame of the tractor.

The upper surface portion 76 of member 64 includes transversely disposed aperture portions extending therethrough, see Figure 4, which have secured in overlying relationship with respect thereto cylinder members 78 and 80 which have disposed therein an outer compression spring member 82 circumposed about an inner compression spring member 84, each of said spring members having lower end portions in engagement with a bottom portion 86 of the support member 64. A spring adapter or support collar 88 includes a lower end portion 90 engageable with the inner spring member 84, said portion 90 extending within the outer spring 82, the adapter collar 88 including an annular flange portion 92 extending from an intermediate portion thereof and engageable with the upper end portion of the outer spring 82. Thus, excessive pressure or force downwardly along the axis of the collar 88 results in meeting the resistance force presented by both the inner and outer springs 84 and 82, respectively, thus providing resilient shock absorbing means for the assembly 46.

The adapter 88 includes a longitudinally extending aligned bore portion 94 which has extending therein a piston rod element 96, said rod element 96 having suitably secured to the upper end portion 98 thereof a fluid motor assembly indicated generally at 100.

The fluid assembly 100 includes a tubular cylinder member 102 circumposed about the piston rod 96, having a lower internally threaded end 103 accommodating therein a centrally apertured mounting nut 104 which will be circumposed about the piston rod 96. Suitable packing means may be incorporated between the piston rod 96 and the nut 104. The end portion 98 of the piston rod has a longitudinally internally threaded bore (not shown) which accommodates therein a suitable fastening screw 106 for mounting on the end of the piston rod a suitable piston element 107 which will engage the inner periphery 108 of the cylinder 102 and which defines therein oppositely disposed variable volume chambers 109 and 110. The end portions 111 of the cylinders 102 include an internal bore portion 112 in communication with the variable volume chamber 110, said bore portion 112 being connected to a suitable connecting element 113 which in turn is connected to a hydraulic or pneumatic pressure line 114, which may be connected by means of a Y-shaped fitting 115, which in turn is connected to a pressure line 116 which is connected to any suitable source of pneumatic or hydraulic pressure 118 conveniently located on the tractor.

The fluid motor assemblies 100 will be controlled from the tractor cab and will be utilized for the purpose of shifting the effect of the weight on the wheels of the tractor and semi-trailer in a manner similar to that described in our co-pending application Serial No. 520,750.

The lower member 42 of the "fifth wheel" assembly has depending therefrom a pair of transversely spaced abutments or cam guide track bracket elements indicated generally at 120. The aforementioned brackets are in substantial vertical planar alignment with the longitudinal axis of the piston rod element 96, said brackets including an upper leg portion 122 suitably secured to a lower surface portion of the lower member 42, and a vertical leg 124 depending from said lower surface portion of the plate portion 42. The upper or horizontal leg 122 includes a depending or downwardly extending elongated cam track portion 126, the leg 124 having a vertically extending elongated cam track portion 128 which defines a continuation of the cam track portion 126.

Secured on the upper end of the cylinder 102 is a cam follower element 130 which has the lower end thereof secured by means of a transverse fastening bolt assembly 132 extending therethrough and through a suitably apertured portion on the terminal end of the cylinder 102. The outer end portion of the cam follower 130, see Figure 5, includes a peripheral groove portion 134 which is disposed in overlying relationship to the continuous cam track portion defined by cam track portions 126 and 128.

Thus, the cam follower 130 provides a pivotal fulcrum element for the portion 42 of the lower member of the "fifth wheel" assembly, and when excessive forces on the semi-trailer due to sudden stops, striking bumps, etc. tend to rotate the forward portion 42 of the lower member of the "fifth wheel" assembly counterclockwise in Figure 4 about the cam follower 130, the resilient shock absorbing means will tend to prevent excessive stress being placed on the "fifth wheel" assembly, and thus tend to equally distribute the force on the frame of the tractor. The fluid motor will have been previously adjusted to accommodate for the desired weight distribution on the wheels of the tractor and semi-trailer, and by the use of such means it will be possible to adjust the weight distribution on the tractor and semi-trailer wheels to come within the allowable limits which have been set up as maximum allowable load per axle in various States.

By virtue of the pivotal relationship of the support member 64 on the side frame members 14 and 16, and the interengagement of the cam follower groove portion 130 and the cam track portions 126 and 128, and further in view of the compression springs 82 and 84, the cam follower will generally be in constant sliding and guided engagement with the cam track portions.

Various positional directional terms, such as "front," "rear," "lower," etc. are utilized herein to have only relative connotation to aid in describing the device and it is not intended to require any particular orientation with respect to any external elements.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the appended claims.

What is claimed is:

1. In a tractor and semi-trailer having a fifth wheel assembly therebetween including a lower member mounted on horizontal pivot axis means on the tractor frame and a cooperating upper member on the semi-trailer, a combined fluid controlled motor and resilient shock absorbing and dampening assembly extending between a frame portion of the tractor and a lower surface portion of the lower member of the fifth wheel assembly for providing a relatively stable connection with the fifth wheel assembly, said combined fluid controlled motor and resilient shock absorbing and dampening assembly comprising a support member carried on a transverse horizontal pivot axis portion on an intermediate portion of said tractor forward of the rear axle thereof, a shock absorbing and fluid motor cylinder member including a lower end portion mounted on an intermediate portion of said support member, a fluid motor assembly including a piston and piston rod assembly, said piston rod including a lower end portion extending into the upper end portion of said cylinder member, compression spring means in said cylinder member in engagement with said lower end portion of said piston rod, said fluid motor assembly including a fluid motor cylinder circumposed about said piston and piston rod assembly and having defined therein two variable volume chambers, a fluid pressure line in communication with one of said chambers for controlling the relative position between said fluid motor cylinder and said piston and piston rod assembly, a follower element secured on an outer end portion of said fluid motor cylinder, and guide means disposed on said lower surface portion of said lower member of the fifth wheel assembly, said guide means being slidably engaged with said follower element.

2. In a tractor and semi-trailer having a fifth wheel assembly therebetween including a lower member mounted on horizontal pivot axis means on the tractor frame and a cooperating upper member on the semi-trailer, a combined fluid controlled motor and resilient shock absorbing and dampening assembly extending between a frame portion of the tractor and a lower and forward surface portion of the lower member of the fifth wheel assembly for providing a relatively stable connection with the fifth wheel assembly, said combined fluid controlled motor and resilient shock absorbing and dampening assembly comprising a support member carried on a transverse horizontal pivot axis portion of an intermediate portion of said tractor forward of the rear axle thereof, a pair of shock absorbing and dampening cylinder members including a lower end portion mounted on transversely spaced intermediate portions of said support member, a pair of fluid motor assemblies each including a piston and a piston rod assembly, each said piston rod including a lower end portion extending into an upper end portion of one of said cylinder members, compression spring means in each of said cylinder members in engagement with a lower portion of each of said piston rods, said fluid motor assemblies each including a fluid motor cylinder circumposed about each said piston and piston rod assembly and having defined therein two variable volume chambers, a fluid pressure line in communication with one of each of said two chambers for simultaneously controlling the relative positions between each said fluid motor cylinder and each said piston and rod assembly, a follower element secured on an outer end portion of each said fluid motor cylinder, and guide means disposed in transverse spaced relationship on lower and forward surface portions of said lower member of the fifth wheel assembly, said guide means being slidably engaged with said follower elements.

3. In a tractor and semi-trailer having a fifth wheel assembly therebetween including a lower member mounted on horizontal pivot axis means on the tractor frame and a cooperating upper member on the semi-trailer, a combined fluid controlled motor and resilient shock absorbing and dampening assembly extending between a frame portion of the tractor and a lower surface portion of the lower member of the fifth wheel assembly for providing a relatively stable connection with the fifth wheel assembly, said combined fluid controlled motor and resilient shock absorbing and dampening assembly comprising a support member carried on a transverse horizontal pivot axis portion on an intermediate portion of the trailer forward of the rear axle thereof, a shock absorbing and dampening cylinder member including a lower end portion mounted on an intermediate portion of said support member, fluid motor assemblies including a piston and piston rod, said piston rod including a lower end portion extending into the upper end portion of said cylinder member, compression spring means in said cylinder member in engagement with the lower portion of said piston rod, said fluid motor assemblies including a fluid motor cylinder circumposed about said piston and piston rod and having defined therein two variable volume chambers, a fluid pressure line in communication with one of said chambers for simultaneously controlling the relative positions between each said fluid motor cylinder and said piston and piston rod, a cam follower element secured on an outer end portion of each said fluid motor cylinder, and cam follower guide means disposed on a lower and front surface portion of the lower member of the fifth wheel assembly, said guide means being slidably engaged with said cam follower element and comprising an angle bracket member depending from said lower surface portion of said lower member of the fifth wheel assembly, said bracket member comprising a first horizontal leg member and a second vertical leg member having an elongated vertical guide portion intersecting and constituting a continuation of said horizontal leg portion, the said cam follower element including an outward portion disposed on said guide portion.

4. In a tractor and semi-trailer unit employing a fifth wheel on the rear end of the tractor for supporting the front end of the semi-trailer, the combination of a support member pivotally mounted on the frame of said tractor forward of the rear axle thereof, a compression coil spring supported on said support member and disposed below the plane of said fifth wheel, a fluid cylinder assembly including a piston and piston rod disposed co-axial with said spring and in abutting relation between said spring and the front of said fifth wheel to be in sliding abutment with the latter, a fluid line in fluid communication with said fluid cylinder assembly for controlling the axial position of said piston rod with respect to said cylinder.

5. In a tractor and semi-trailer unit employing a fifth wheel on the rear end of the tractor for supporting the front end of the semi-trailer, the combination of an extension on the forward end of said fifth wheel, a support member pivotally mounted on the frame of said tractor forward of the rear axle thereof and below the level of said extension, a compression coil spring disposed on said support member and below the plane of said fifth wheel and projecting upwardly toward said extension, a fluid cylinder assembly including a piston and piston rod disposed co-axial with said spring and between said spring and said extension, one end of said assembly in compressive relation with said spring and the other end of said assembly in sliding abutment with said extension for selectively varying the force between the pivot of said support member and said extension by control of fluid pressure in said cylinder assembly, a fluid line in fluid communication with said fluid cylinder assembly for controlling the axial position of said piston rod with respect to said cylinder.

6. In a tractor and semi-trailer unit employing a fifth wheel pivotally mounted on the rear end of the tractor for supporting the front end of the semi-trailer, the combination of an extension on the forward end of said fifth wheel, a vertically disposed abutment on the lower surface of said extension, a support member pivotally mounted on the frame of said tractor forward of the rear axle thereof and below the level of said extension and having an opening directed upwardly, a compression coil spring disposed in said opening on said support with the axis thereof directed toward said extension and the upper end of said spring spaced from said extension, a fluid cylinder assembly disposed in the space between said spring and said extension to be co-axial with said spring and in sliding engagement with said abutment on said extension, said assembly including a cylinder and piston and piston rod, a fluid line in fluid communication with said fluid cylinder assembly for controlling the respective axial positions of said piston rod and said cylinder.

7. A semi-trailer towing truck of the type including a frame pivotally supporting a fifth wheel on a horizontal axis on said frame at least approximately directly above the rear axle of said truck, comprising a piston rod type fluid cylinder and compression coil spring combination co-axial in end-to-end relation and pivotally mounted at one end on said frame of said truck below the plane of said fifth wheel and about an axis parallel to and forward of said rear axle and at the other end being in sliding abutment with the lower surface of said fifth wheel forward of its said horizontal axis, a fluid line in communication with said fluid cylinder and extending therefrom for remote control of fluid pressure within said cylinder to selectively extend its piston rod along the line between the pivot of said combination and the sliding abutment thereof.

References Cited in the file of this patent

UNITED STATES PATENTS

| 2,250,154 | Pointer | July 22, 1941 |
| 2,391,372 | Weigand | Dec. 18, 1945 |
| 2,633,366 | Armington | Mar. 31, 1953 |
| 2,727,755 | Hume | Dec. 20, 1955 |